United States Patent
Ayres et al.

[11] Patent Number: 6,141,881
[45] Date of Patent: Nov. 7, 2000

[54] ELECTRONIC ANALOGUE COMPASS

[75] Inventors: Craig A. Ayres; John A. Ayres, both of Lapeer; Douglas Hall, Clarkston, all of Mich.

[73] Assignee: Invotronics Manufacturing, Lapeer, Mich.

[21] Appl. No.: 09/185,078

[22] Filed: Nov. 3, 1998

Related U.S. Application Data

[60] Provisional application No. 60/064,020, Nov. 3, 1997.

[51] Int. Cl.[7] .............................. G01C 17/02; G01C 17/28
[52] U.S. Cl. .............................. 33/361; 33/352; 33/355 R
[58] Field of Search .................. 33/361, 356, 355 R, 33/366.11, 366.25, 366.26, 366.27, 363 Q, 352, 363 R, 362; 324/247, 252

[56] References Cited

U.S. PATENT DOCUMENTS

| | | | |
|---|---|---|---|
| 1,946,710 | 2/1934 | Pickard | 33/361 |
| 3,660,907 | 5/1972 | Sutherland | 33/349 |
| 4,677,381 | 6/1987 | Geerlings | 33/361 |
| 5,046,260 | 9/1991 | Wellhausen | 33/356 |
| 5,095,630 | 3/1992 | Nomura et al. | 33/356 |
| 5,173,709 | 12/1992 | Lauro et al. | 33/349 |
| 5,216,816 | 6/1993 | Ida | 33/356 |
| 5,255,442 | 10/1993 | Schierbeek et al. | 33/361 |
| 5,394,029 | 2/1995 | Gay et al. | 33/361 |
| 5,435,070 | 7/1995 | Kilian | 33/361 |

FOREIGN PATENT DOCUMENTS

WO 93/09400  5/1993  WIPO .

*Primary Examiner*—Andrew H. Hirshfeld
*Attorney, Agent, or Firm*—Patton Boggs LLP

[57] ABSTRACT

An compass having an electronic magnetic field sensor and an analog directional display is disclosed wherein a signal from the field sensor proportional to one component of the earth's magnetic field is alternated in polarity and integrated to produce a triangular waveform the frequency of which is proportional to the strength of that field component and wherein a triangular waveform having a frequency proportional to the second component of the earth's magnetic field is produced in the same manner. These values are used by a microcontroller to control an air-core gauge such that a disk with reference markings attached to the gauge remains positioned with one of the reference markings facing either magnetic or true north. A resistor ladder network is also connected in parallel to the inputs of the integrators and controlled by the microprocessor through a shift register in order keep the integrators out of saturation.

2 Claims, 4 Drawing Sheets

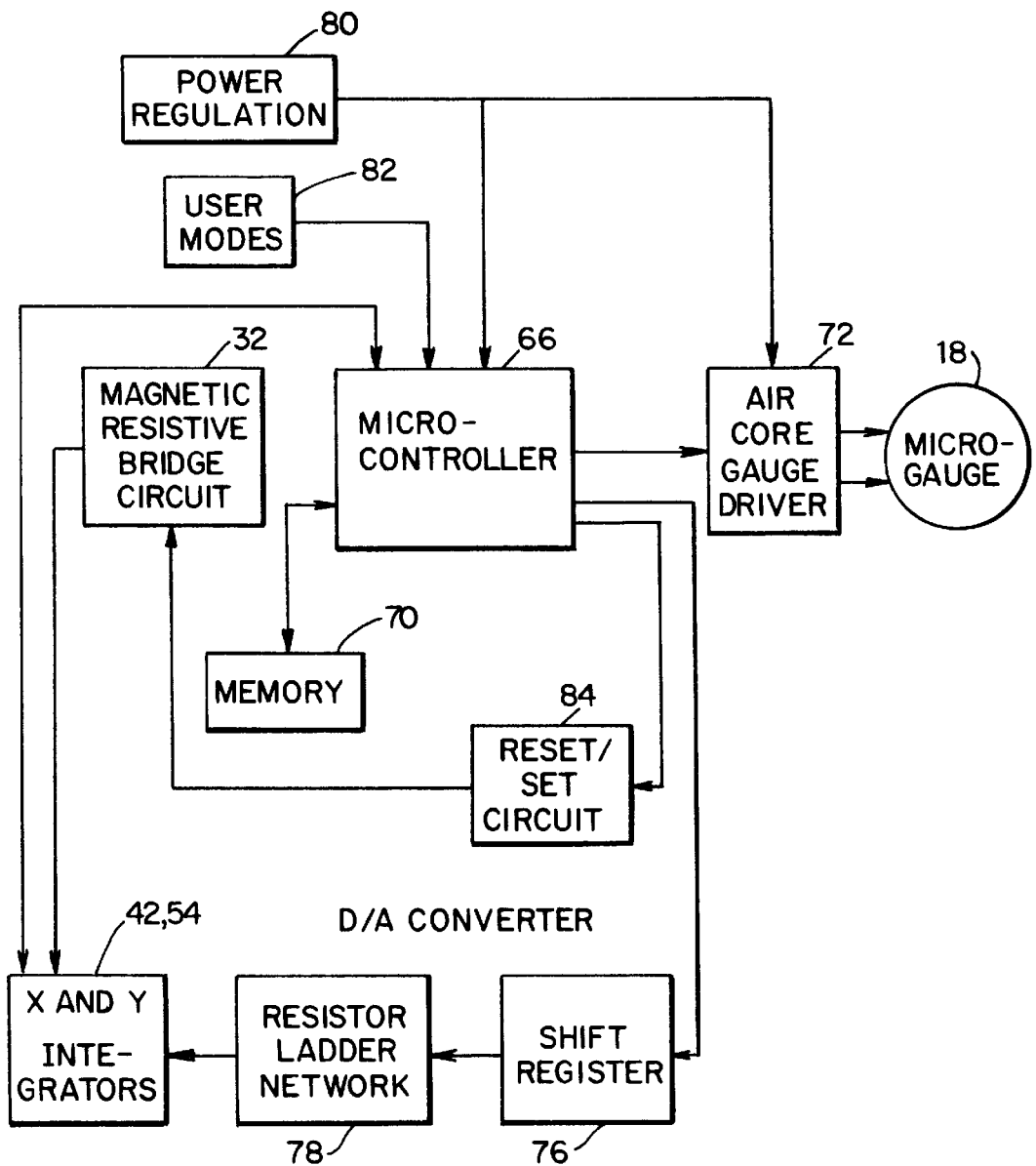

ELECTRONIC ANALOGUE COMPASS

The present application is a continuation of U.S. Provisional Patent Application Ser. No. 60/064,020, filed on Nov. 3, 1997, and priority based on this earlier application is claimed herein.

BACKGROUND OF THE INVENTION

The present invention is directed toward an electronic analogue compass, and more particularly, toward an electronic analogue compass that uses an air-core gauge to rotate a disk marked with compass directions.

FIELD OF THE INVENTION

Both digital and analogue compasses are known for providing an indication of magnetic north, and from this information true north can be determined. In additional to traditional compasses that rely on a suspended magnet to point toward the earth's magnetic north, a new generation of digital compasses has emerged that use electronic circuitry for detecting the presence and the orientation of the earth's magnetic field. These electronic compasses often rely on magneto-resistors, devices whose resistance varies as a function of the magnetic field to which they are exposed. When four of these elements are formed into an electronic bridge circuit having two pairs of mutually perpendicular elements, the orientation of a magnetic field can be determined by measuring the resistance offered by each of the four magneto-resistors and calculating the magnetic field needed to cause the resistance of each element in the bridge to assume the measured values.

Honeywell Corporation sells a magnetic sensor of this type under product number HMC1022, and the use of this product and related circuitry for detecting magnetic fields are described in the following publications, which are incorporated herein by reference: Honeywell Sensor Products HMC 1021/1022 Specification Sheet: "1 and 2 Axis Magnetoresistive Microcircuits," Honeywell Application Note HMC 1001 and HMC 1002: "One and Two Axis Magnetic Sensors," Honeywell Paper AN-201: "Set/Reset Pulse Circuits for Magnetic Sensors," Honeywell Paper AN-203: "Compass Heading Using Magnetometers," and Honeywell Paper AN-202: "Magnetic Sensor Hybrid Applications."

While such compasses are generally effective, much of the circuitry needed to build them, including the circuitry needed to display a digital compass reading, can be expensive and add to the cost of the product. Less expensive analog compasses are often delicate and may loose accuracy if dropped or mishandled. In addition, such compasses may not read accurately when shaken or jarred such as when used in an automobile. The jarring and frequent turning of the vehicle can shift the compass off a proper heading. A viscous fluid may be used to damp such fluctuations, but this may cause the compass to respond sluggishly, and a person viewing the compass will have to watch carefully to be sure that the compass has in fact stopped at a new heading. Without such a damping mechanism, the compass pointer may fluctuate uncontrollably while a vehicle is in motion and provide no useful information. It would therefore be desirable to provide a compass that is as accurate and simple to construct as a digital compass, that could be read as easily as an analog compass, that is less expensive than typical digital compasses and that can quickly turn to a proper orientation and remain in that orientation even when subjected to moving or jarring such as that which occurs in a moving motor vehicle.

SUMMARY OF THE INVENTION

These and other problems are addressed by the present invention which comprises a digital compass having an analogue display controlled by a microcontroller and an air-core gauge. In a preferred embodiment, the display comprises a stainless steel disk marked with compass headings that is coaxially mounted on the rotary output shaft of a gauge motor. A microcontroller controls the movement and position of the output shaft in order to point the "North" reference marking on the disk toward true or magnetic north. A sensor comprising a magneto-resistive bridge circuit is used to determine two components of the earth's magnetic field and to generate first and second signals proportional in strength to these components. These signals are each processed by integrating circuits which produce as outputs waveforms having frequencies proportional to the magnitude of the two components, and these waveforms are inputted into the microcontroller. The microcontroller, pre-programmed with information on the initial orientation of the display disk, then computes the angular change necessary to rotate the disk to make the "north" reference marking point toward magnetic north. The disk can also be made to point toward true north if information is provided in the microprocessor concerning the geographic location of the compass.

It is therefore a principal object of the present invention to provide an electronic compass having an analogue display;

It another object of the invention to provide a compass that can maintain a given orientation while being subject to movement and jarring.

It is a further object of the invention to provide a compass having an analogue display and an electronic sensor for sensing the earth's magnetic field suitable for use in a moving vehicle.

It is yet another object of the invention to provide a digital compass having an analogue display in which an air-core gauge is used to position a disk marked with compass headings and a microcontroller is used to orient the disk such that one of the markings points in the direction of magnetic north.

It is yet a further object of the present invention to provide a digital compass having a microcontroller that receives signals from a magneto-resistive bridge circuit and calculates from this input output signals for controlling a gauge connected to a plate marked with compass headings to properly orient the compass headings on the plate.

BRIEF DESCRIPTION OF THE DRAWINGS

These and other objects of the invention will be better understood from a reading and understanding of the following detailed description of a preferred embodiment of the invention together with the following drawings of which.

DETAILED DESCRIPTION OF A PREFERRED EMBODIMENT

Figure 1:
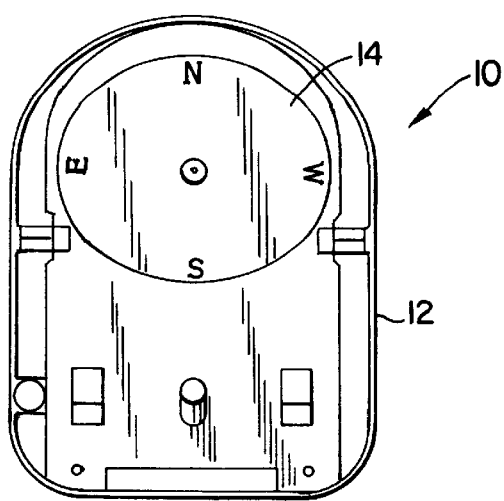
FIG. 1 is a front elevational view of a compass according to the present invention with its cover removed.
Figure 2:
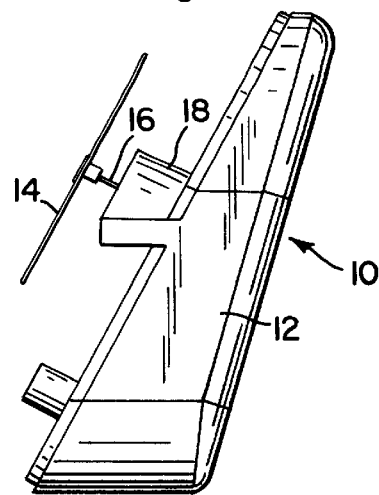
FIG. 2 is a side elevational view of the compass of FIG. 1.
Figure 3:
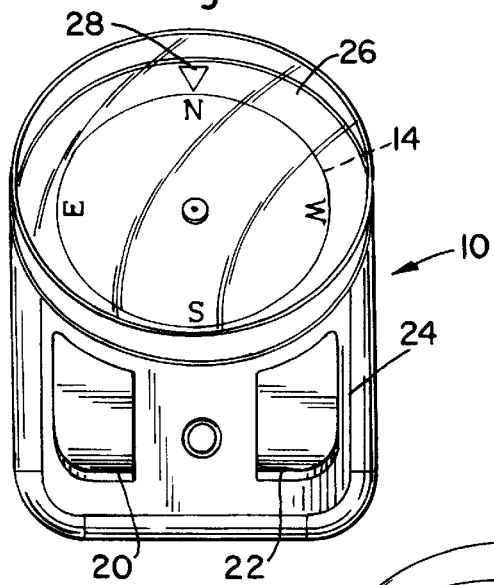
FIG. 3 is a front elevational view of the compass in FIG. 1 with the cover in place.
Figure 4:
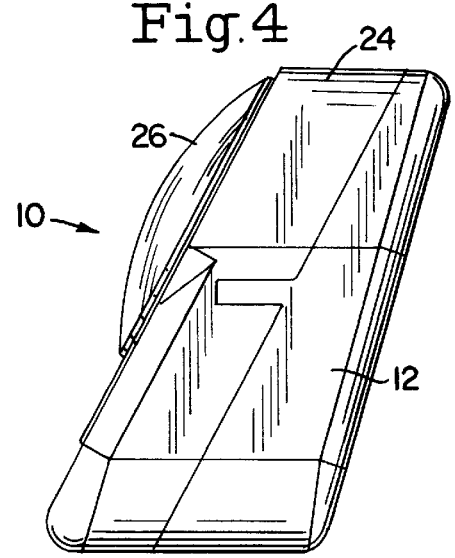
FIG. 4 is a side elevational view of the compass in FIG. 3.
Figure 5:
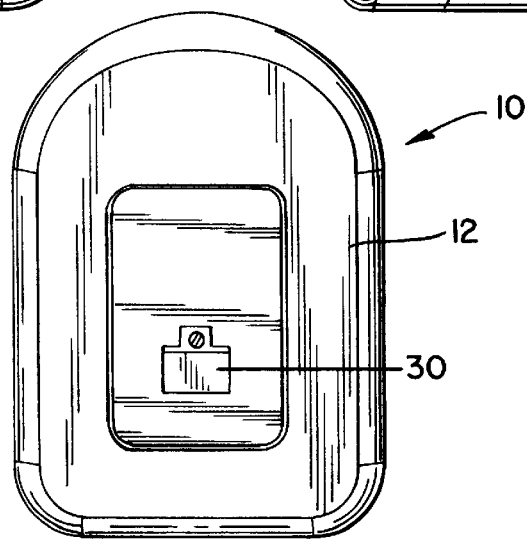
FIG. 5 is a rear elevational view of the compass of FIG. 3.

Referring now to the drawings, wherein the showings are for the purpose of illustrating a preferred embodiment of the subject invention only and not for the purpose of limiting same, FIG. 1 shows a compass 10 comprising a housing 12 and a stainless steel disk 14 bearing markings N, S, E, and W to identify four compass directions. Disk 14 is supported by the rotary output shaft 16 of a gauge motor 18 as shown in FIG. 2. Suitable gauge motors are shown and described in U.S. Pat. No. 5,686,832 which is incorporated herein by reference. Such gauges are available from Invotronics Manufacturing of Lapeer, Mich. A pair of pushbuttons 20 and 22 are provided on the front of the compass housing, button 20 serving to turn the compass on and off and button 22 serving to switch the compass between two or more different modes of operation, such as a calibration mode and an operational mode. A front cover 24 having a transparent lens portion 26 is shown in FIGS. 3 and 4 which cover serves to protect the gauge and disk. Transparent lens 26 includes a reference mark 28 above the disk markings N, S, E, and W. When the compass is properly calibrated, the compass direction directly beneath reference marking 28 will be the direction that the compass is facing. FIG. 5 shows the rear side of the compass which includes an opening 30 for connecting the compass to a power supply (not shown).

Figure 6A:
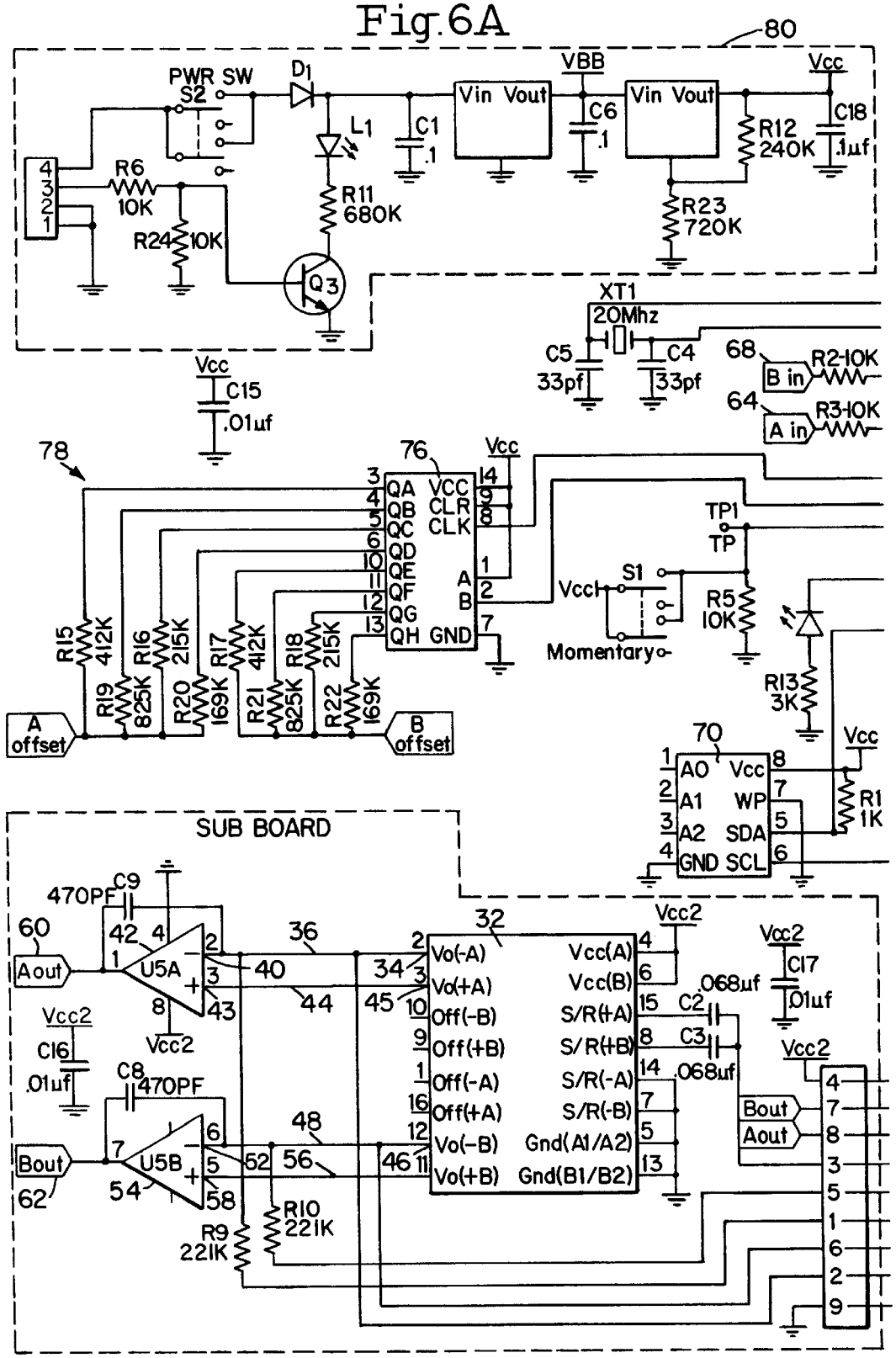
FIG. 6 is a circuit diagram showing the control circuitry for the compass of the present invention; and, FIG. 7 is a block diagram schematically showing the relationship between the elements of the subject invention.
Figure 6B:
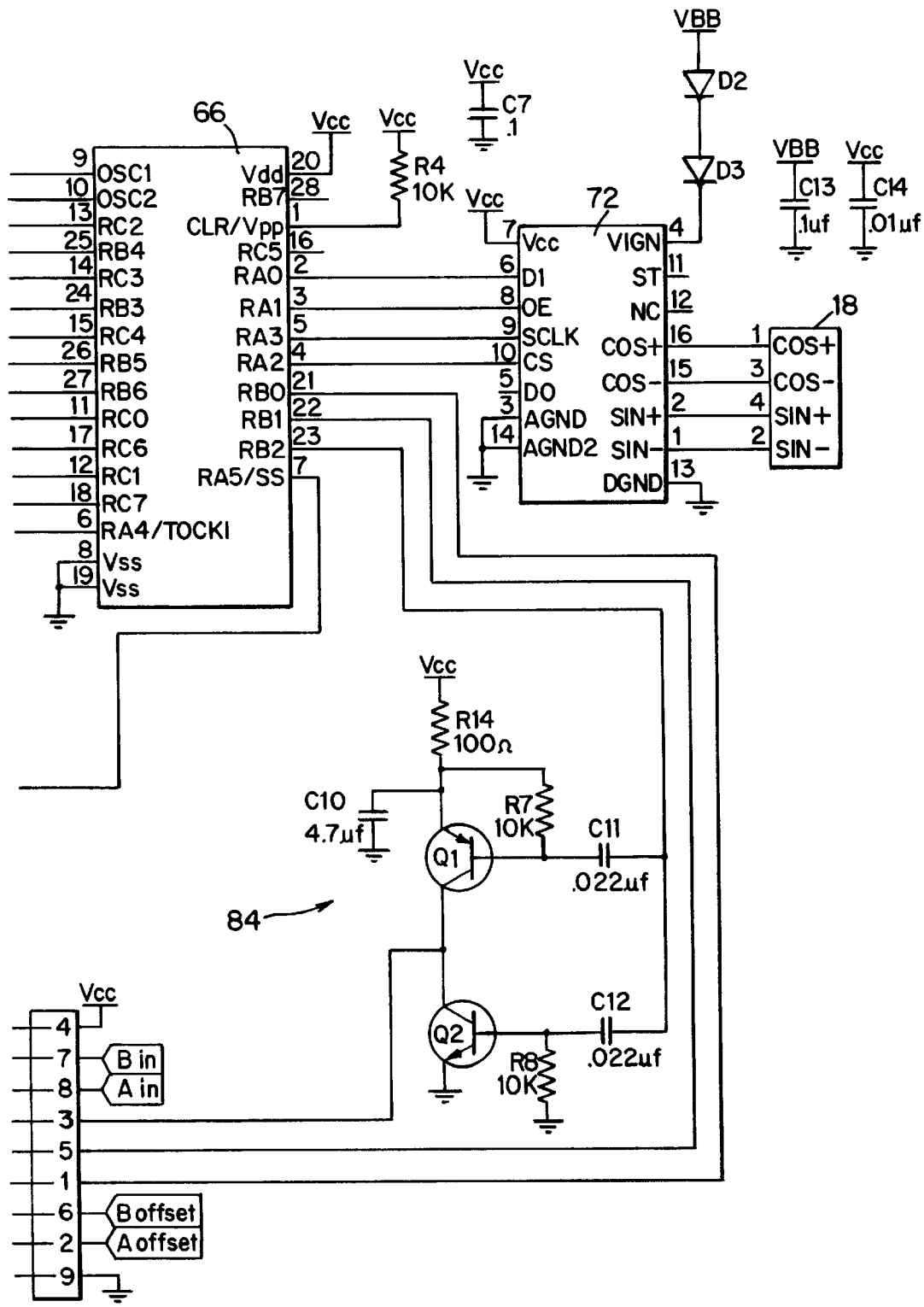

FIG. 6 shows the circuitry for controlling the subject compass. A magnetic field sensor 32 containing a magnetoresistor bridge circuit is used to detect first and second components of the earth's magnetic field. A preferred sensor is available from Honeywell as model number HMC 1021. Sensor 32 includes a first output 34 at a voltage 36 connected to the inverting input 40 of a first integrating operational amplifier 42, a second output 44 at a voltage equal in magnitude but opposite in sign to voltage 36 and connected to the non-inverting input 43 of integrator 42, a third output 46 at a voltage 48 connected to the inverting input 52 of a second integrator 54, and a fourth output 56 at a voltage equal in magnitude but opposite in sign to voltage 48, the output 56 connected to the non-inverting input 58 of second integrator 54. Integrator 42 integrates signal 36 to produce a linearly increasing or decreasing output 60, depending on the sign of signal 36. Output 60 is monitored by microprocessor 66, and when it reaches a predetermined level, the sign of the input to integrator 42 is switched so that output 60 changes direction. Microprocessor 66 continues to monitor the magnitude of output 60, reversing it as necessary to keep it between two predetermined voltage levels. A preferred microprocessor is model number PIC16C63 made by Microchip Corp. Thus the output of the integrator is a triangular waveform, and the frequency of this waveform is proportional to the strength of a first component of the earth's magnetic field. The sign of the input into second integrator 54 is alternated in a like manner to produce a similar triangular waveform at output 62 of the second integrator, the frequency of which output is proportional to the strength of a second component of the earth's magnetic field.

The output 60 of first integrator 42 is input into a first input 64 of microcontroller 66 while the output of second integrator 54 is input into a second input 68 of the microcontroller. Based on these inputs, the microcontroller determines the orientation of the sensor and the direction of magnetic north. If information on the geographic location of the compass and hence the angular difference between true north and magnetic north at that location has been programmed into memory 70, the direction of true north can also be calculated.

Microcontroller 66 is connected to a gauge controller 72 which in turn is used to control the angular orientation of air-core gauge 18 to which disk 14 marked with compass directions is attached as described hereinabove. A preferred gauge controller is model number SA5775 air-core gauge driver made by Phillips. During assembly, sensor 32 is oriented such that it faces magnetic north and disk 14 is mounted on gauge 18 such that the marking "N" on the disk is also facing magnetic north. This arrangement can be taken as a zero position for the compass. As the sensor is turned from magnetic north, the sensor's output reflect a deviation from magnetic north, microcontroller 66 calculates this deviation, and sends signals to gauge controller 72 with sine and cosine information for turning gauge 18 by a sufficient angular amount so that marking "N" on disk 14 again faces magnetic north (or true north if this information is available). Reference marking 26 will then lie over the compass direction corresponding to the direction that the compass is facing.

At each power up of the compass, microprocessor 66 also measures the magnitude of integrator outputs 60 and 62 to determine whether these values are completely within a given range of voltages to ensure that the integrators will operate in their operating range and not in saturation. If the magnitudes of the signals are not within the operating range, microcontroller 66 signals a shift register 76 to connect one or more resistors from resistor ladder network 78 in parallel with the inputs of integrators 42 and 54. Microcontroller 66 continues to monitor the magnitude of these output, adding and removing resistance as necessary until the output of the integrators has stabilized within the operating range of the system. Because it is the frequency of the waveforms that is used by the microcontroller to set the orientation of gauge 18, the voltage level of these waveforms is not important as long as the waveform remains within the output limits of the operational amplifiers.

The control circuitry also includes a power circuit 80 controlled by pushbutton 20, and a user mode selection circuit 82 connected to pushbutton 22 for switching the circuit between various modes such as an operational mode described above, and a calibration mode, standard for many sensors including sensor 32, which allows the sensor to compensate for any additional sources of magnetism that would otherwise affect it determination of magnetic north. This is accomplished by driving the vehicle in which the compass is mounted in a circle and letting the calibration feature of the sensor operate in its intended manner. Finally, a set/reset circuit 84 is also provided. These features are also shown schematically in the block diagrams in FIG. 7.

The computer code for controlling microprocessor 66 is received on the attached sheets:

The subject invention has been described in terms of a preferred embodiment, it being understood that obvious modifications and additions to this disclosure will become apparent to persons skilled in the art upon a reading and understanding of the foregoing description. It is applicant's intention that all such modifications and additions be included within the scope of this application to the extent that they are described by the several claims appended hereto.

What is claimed:

1. An analogue compass comprising:

sensing means for sensing first and second components of a magnetic field and for producing first and second outputs proportional to said first and second components;

an integrating means in communication with said sensing means for performing an integrate on said first output, and for performing an integrate on said second output, each of said integration operations continuing until a first pre-determined voltage is reached and then reversing in direction of integration until a second pre-determined voltage is reached and then reversing in direction, the time of changing from said first to said second pre-determined voltage being inversely proportional to said first and second outputs, respectively, so as to generate a first and a second triangle form integration signal, having a first and a second frequency, respectively, dependent on said first and second outputs, respectively;

microprocessor means in communication with said integrating means for determining true north based on said first and second triangle form integration signals;

a gauge motor having a rotary output shaft;

a disk coaxial mounted on said output shaft for rotation therewith, said disk including at least one reference marking;

a gauge controller for controlling said gauge motor to vary the orientation of said reference marking on said disk with respect to said magnetic field;

said microprocessor means communicating with said gauge controller to cause said reference marking on said disk to point toward true north.

2. The compass of claim 1 including anti-drift circuit means in communication with said integrating means and said microprocessor means for maintaining said first and second triangle form integration signals within a given range.

* * * * *